United States Patent
Adair et al.

(10) Patent No.: US 10,797,353 B2
(45) Date of Patent: *Oct. 6, 2020

(54) METHOD OF MANUFACTURING AN ELECTROCHEMICAL CELL

(71) Applicant: GM GLOBAL TECHNOLOGY OPERATIONS LLC, Detroit, MI (US)

(72) Inventors: Keegan Adair, Port Coquitlam (CA); Fang Dai, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 298 days.

This patent is subject to a terminal disclaimer.

(21) Appl. No.: 15/862,187

(22) Filed: Jan. 4, 2018

(65) Prior Publication Data

US 2019/0207245 A1 Jul. 4, 2019

(51) Int. Cl.

| | | |
|---|---|---|
| *H01M 4/1395* | (2010.01) | |
| *H01M 4/58* | (2010.01) | |
| *H01M 4/48* | (2010.01) | |
| *H01M 10/052* | (2010.01) | |
| *H01M 10/058* | (2010.01) | |
| *H01M 10/04* | (2006.01) | |
| *H01M 2/14* | (2006.01) | |
| *H01M 4/66* | (2006.01) | |
| *H01M 4/04* | (2006.01) | |
| *H01M 4/74* | (2006.01) | |
| *H01M 4/38* | (2006.01) | |
| *H01M 4/02* | (2006.01) | |

(52) U.S. Cl.
CPC ......... *H01M 10/058* (2013.01); *H01M 2/145* (2013.01); *H01M 4/0404* (2013.01); *H01M 4/049* (2013.01); *H01M 4/0435* (2013.01); *H01M 4/0471* (2013.01); *H01M 4/382* (2013.01); *H01M 4/58* (2013.01); *H01M 4/581* (2013.01); *H01M 4/661* (2013.01); *H01M 4/742* (2013.01); *H01M 10/04* (2013.01); *H01M 2004/021* (2013.01)

(58) Field of Classification Search
CPC .... H01M 10/058; H01M 4/0404; H01M 4/58; H01M 4/382; H01M 4/581; H01M 4/0435; H01M 4/0471; H01M 4/742; H01M 4/049; H01M 4/661; H01M 2/145; H01M 10/04; H01M 2004/021
See application file for complete search history.

(56) References Cited

U.S. PATENT DOCUMENTS

| | | | | |
|---|---|---|---|---|
| 4,508,608 A | * | 4/1985 | Palmer | ................ C23C 14/0623 |
| | | | | 204/192.15 |
| 4,539,052 A | * | 9/1985 | Palmer | ...................... C23C 8/62 |
| | | | | 148/240 |
| 2016/0240376 A1 | * | 8/2016 | Yeh | .................... H01L 21/02568 |
| 2017/0073809 A1 | * | 3/2017 | Choi | .................... C23C 16/305 |

OTHER PUBLICATIONS

Liu, Y. et al.; Lithium-coated polymeric matrix as a minimum volume-change and dendrite-free lithium metal anode; nature Communications; DOI: 10.1038/ncomms10992; pp. 1-9.

* cited by examiner

*Primary Examiner* — Muhammad S Siddiquee
(74) *Attorney, Agent, or Firm* — Quinn IP Law

(57) ABSTRACT

A method of manufacturing an electrochemical cell may comprise exposing a surface of a metal substrate to a chalcogen in gas phase such that a metal chalcogenide layer forms on the surface of the metal substrate. A lithium metal foil may be laminated onto the metal chalcogenide layer on the surface of the metal substrate such that a surface of the lithium metal foil physically and chemically bonds to the metal chalcogenide layer on the surface of the metal substrate.

18 Claims, 3 Drawing Sheets

METHOD OF MANUFACTURING AN ELECTROCHEMICAL CELL

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium batteries generally comprise one or more electrochemical cells including a negative electrode, a positive electrode, a porous separator, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of the lithium ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Uniform and sustained physical contact between the negative and positive electrodes and their respective current collectors is necessary to ensure effective charge transport therebetween and efficient battery operation throughout the life of the battery.

SUMMARY

In a method of manufacturing an electrochemical cell, a porous or non-porous metal substrate and a lithium metal foil having a first surface and an opposite second surface may be provided. A surface of the metal substrate may be exposed to a chalcogen in gas phase such that a conformal metal chalcogenide layer forms on the surface of the metal substrate. The lithium metal foil may be laminated onto the metal chalcogenide layer on the surface of the metal substrate such that the first surface of the lithium metal foil physically and chemically bonds to the metal chalcogenide layer on the surface of the metal substrate.

The surface of the metal substrate and the metal chalcogenide layer may be heated to a temperature above a melting point of lithium such that, when the lithium metal foil is laminated onto the metal chalcogenide layer on the surface of the metal substrate, the first surface of the lithium metal foil locally melts and actively wets the metal chalcogenide layer on the surface of the metal substrate, without melting the second surface of the lithium metal foil. For example, the surface of the metal substrate and the metal chalcogenide layer may be heated to a temperature in the range of 250° C. to 450° C. prior to laminating the lithium metal foil onto the metal chalcogenide layer on the surface of the metal substrate. In one form, the second surface of the lithium metal foil may be maintained at a temperature below 180° C. while the lithium metal foil is laminated onto the metal chalcogenide layer on the surface of the metal substrate.

The lithium metal foil may be laminated onto the metal chalcogenide layer on the surface of the metal substrate by positioning the lithium metal foil adjacent the metal substrate such that the first surface of the lithium metal foil confronts the surface of the metal substrate. Then, the metal substrate and the lithium metal foil may be passed between a pair of metal rollers.

The metal substrate may comprise a non-porous metal foil, a perforated metal sheet, or a porous metal mesh.

The metal substrate may comprise copper. In such case, the metal chalcogenide layer may comprise copper oxide, copper sulfide, copper selenide, or a combination thereof.

The chalcogen may comprise oxygen, sulfur, selenium, or a combination thereof. In such case, the metal chalcogenide layer may comprise a metal oxide, a metal sulfide, a metal selenide, or a combination thereof.

In one form, the chalcogen may comprise oxygen. In such case, the surface of the metal substrate may be exposed to gaseous oxygen by heating the metal substrate in air such that the gaseous oxygen chemically reacts with and bonds to the surface of the metal substrate.

In another form, the chalcogen may comprise sulfur or selenium. In such case, the surface of the metal substrate may be exposed to gaseous sulfur or selenium by heating a volume of solid phase sulfur or selenium to release a volume of gaseous sulfur or selenium therefrom. Then, the surface of the metal substrate may be exposed to the volume of gaseous sulfur or selenium such that the gaseous sulfur or selenium chemically reacts with and bonds to the surface of the metal substrate.

The metal substrate may be non-porous and may include a first major surface and an opposite second major surface. In such case, the metal chalcogenide layer may be formed on at least one of the first or second major surfaces of the metal substrate.

The metal substrate may have a thickness in the range of 8-20 µm.

The metal chalcogenide layer may have a thickness in the range of 1-500 nm.

The lithium metal foil may have a thickness in the range of 5-100 µm.

The metal substrate may be formed into a negative electrode current collector exhibiting a desired size and shape and having at least one lithium metal negative electrode layer physically and chemically bonded thereto.

In another method of manufacturing an electrochemical cell, a porous or non-porous metal substrate having a first surface and an opposite second surface may be provided. In addition, a first lithium metal foil and a second lithium metal foil may be provided, with each of the first and second lithium metal foils having a first surface and an opposite second surface. The first and second surfaces of the metal substrate may be exposed to a chalcogen in gas phase such that a first metal chalcogenide layer forms on the first surface of the metal substrate and a second metal chalcogenide layer forms on the second surface of the metal substrate. The first and second lithium metal foils may be respectively laminated onto the first and second metal chalcogenide layers on the first and second surfaces of the metal substrate such that the first surface of the first lithium metal foil physically and chemically bonds to the first metal chalcogenide layer on the first surface of the metal substrate and the first surface of the second lithium metal foil physically and chemically bonds to the second metal chalcogenide layer on the second surface of the metal substrate.

The metal substrate and the first and second metal chalcogenide layers may be heated to a temperature above a melting point of lithium such that, when the first and second lithium metal foils are respectively laminated onto the first and second metal chalcogenide layers on the first and second surfaces of the metal substrate, the first surface of the first lithium metal foil locally melts and actively wets the first metal chalcogenide layer on the first surface of the metal substrate without melting the second surface of the first lithium metal foil, and first surface of the second lithium metal foil locally melts and actively wets the second metal chalcogenide layer on the second surface of the metal substrate without melting the second surface of the second lithium metal foil.

The first and second lithium metal foils may be respectively laminated onto the first and second metal chalcogenide layers on the first and second surfaces of the metal substrate by positioning the first and second lithium metal foils adjacent the metal substrate such that the first surface of the first lithium metal foil confronts the first surface of the metal substrate and the first surface of the second lithium metal foil confronts the second surface of the metal substrate. Then, the metal substrate and the first and second lithium metal foils may be passed between a pair of metal rollers.

DETAILED DESCRIPTION

The presently disclosed electrochemical cell includes lithium metal as a negative electrode material and thus exhibits relatively high energy density, as compared to electrochemical cells that include other elements or compounds as negative electrode materials. During manufacture of the electrochemical cell, a robust physical and chemical bond is formed between the lithium metal and a surface of a negative electrode current collector via formation of an intermediate metal chalcogenide layer. In particular, the metal chalcogenide layer allows for the formation of a superior bond between the lithium metal negative electrode layer and the negative electrode current collector, while also improving the coulombic efficiency of the negative electrode layer and without adversely impacting the impedance of the electrochemical cell, as compared to electrochemical cells that include lithium metal negative electrode layers formed directly on their negative electrode current collectors.

Figure 1:
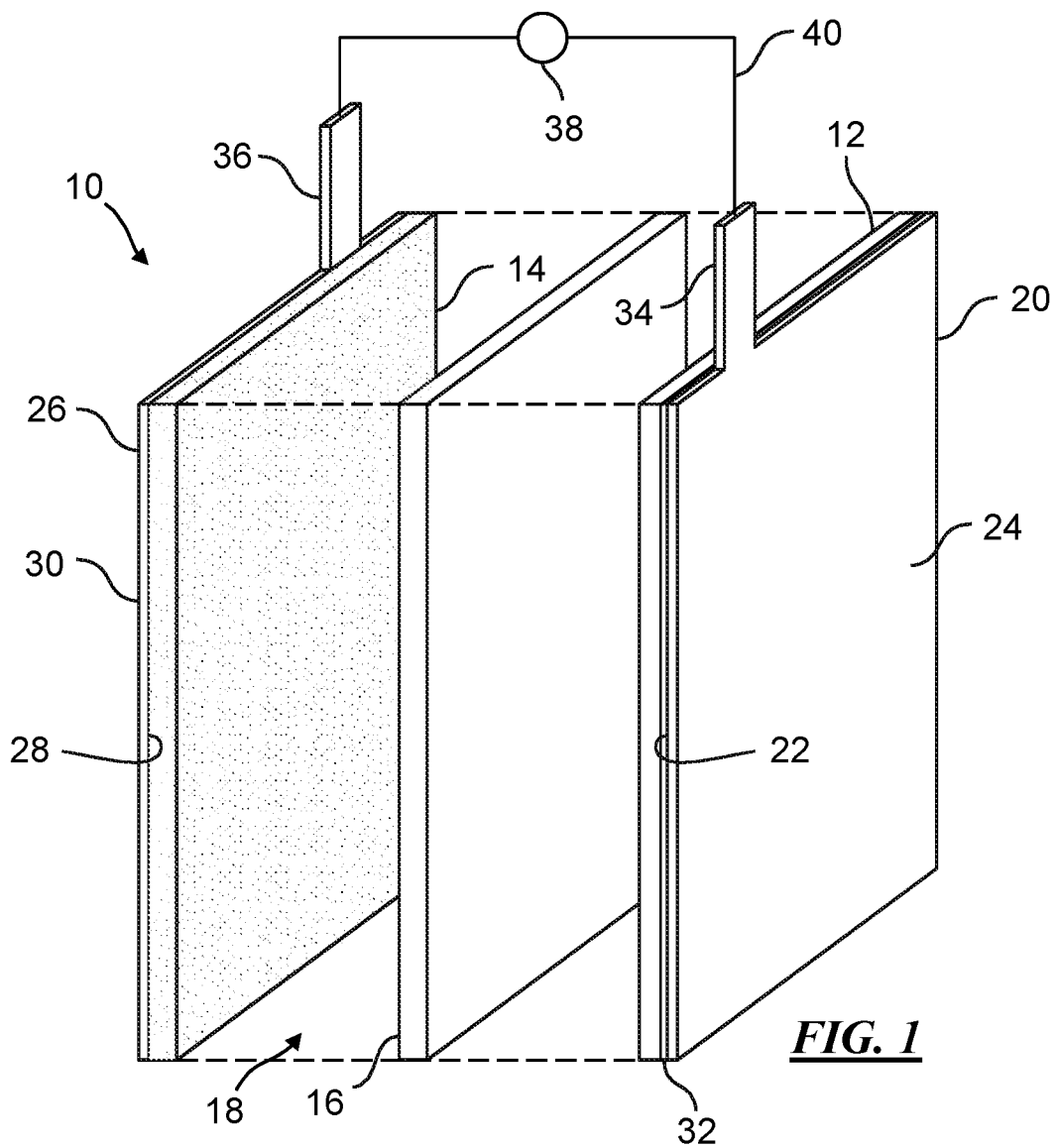
FIG. 1 is an exploded perspective view of an electrochemical cell for a secondary lithium metal battery, the electrochemical cell includes a lithium metal negative electrode layer coupled to a negative electrode current collector, a positive electrode layer coupled to a positive electrode current collector, a porous separator layer disposed between the negative and positive electrode layers, and an electrolyte in ionic contact with the positive and negative electrode layers.

FIG. 1 illustrates in idealized fashion an exploded view of an electrochemical cell 10 for a secondary lithium metal battery (not shown) that includes a lithium metal negative electrode layer 12, a positive electrode layer 14, a porous separator layer 16 sandwiched between the negative and positive electrode layers 12, 14, and a non-aqueous electrolyte 18 in ionic contact with the positive and negative electrode layers 12, 14. A negative electrode current collector 20 including a first major surface 22 and an opposite second major surface 24 is physically and electrically coupled to the negative electrode layer 12. In addition, a positive electrode current collector 26 including a first major surface 28 and an opposite second major surface 30 is physically and electrically coupled to the positive electrode layer 14. The electrochemical cell 10 may have a thickness, measured from the second major surface 24 of the negative electrode current collector 20 to the opposite second major surface 30 of the positive electrode current collector 26 in the range of about 100 micrometers to about one millimeter.

The lithium metal negative electrode layer 12 is chemically and physically bonded to the first major surface 22 of the negative electrode current collector 20 via an intermediate metal chalcogenide layer 32. The metal chalcogenide layer 32 may be "lithiophilic," meaning that lithium has an affinity for the metal chalcogenide layer 32 and actively wets the chalcogenide layer 32. As such, the metal chalcogenide layer 32 may help the negative electrode layer 12 adhere to the surface 22 of the negative electrode current collector 20 and also may help maintain electrical contact between the negative electrode layer 12 and the negative electrode current collector 20 during operation and/or movement of the electrochemical cell 10. For example, the chalcogenide layer 32 may help prevent delamination or separation of the negative electrode layer 12 from the negative electrode current collector 20 during bending or flexing of the electrochemical cell 10. In addition, the chalcogenide layer 32 may promote wetting of the lithium metal negative electrode layer 12 on the first major surface 22 of the negative electrode current collector 20 during manufacture of the electrochemical cell 10 and during subsequent charging cycles.

In FIG. 1, a single negative electrode layer 12 is formed on the first major surface 22 of the negative electrode current collector 20 and a single positive electrode layer 14 is formed on the first major surface 28 of the positive electrode current collector 26. However, in other embodiments, both the first and second major surfaces 22, 24, 28, 30 of the negative and positive electrode current collectors 20, 26 may be respectively coated with first and second negative and positive electrode layers (not shown), for example, such as when the electrochemical cell 10 is combined with multiple other electrochemical cells in an electrochemical cell stack (not shown). In such case, the first and second negative electrode layers may be respectively bonded to the first and second major surfaces 22, 24 of the negative electrode current collector 20 via first and second intermediate chalcogenide layers (not shown).

The lithium metal negative electrode layer 12 may consist essentially of lithium (Li) metal. For example, the lithium metal negative electrode layer 12 may comprise, by weight, greater than 97% lithium or, more preferably, greater than 99% lithium. However, the negative electrode layer 12 preferably does not comprise any other elements or compounds that undergo a reversible redox reaction with lithium during operation of the electrochemical cell 10. For example, the negative electrode layer 12 preferably does not comprise an intercalation host material that is formulated to undergo the reversible insertion or intercalation of lithium ions or an alloying material that can electrochemically alloy and form compound phases with lithium. In addition, the negative electrode layer 12 preferably does not comprise a conversion material or an alloy material that can electrochemically alloy and form compound phases with lithium. Some examples of materials that are preferably excluded from the negative electrode layer 12 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). In addition, the negative electrode layer 12 preferably does not comprise a polymeric binder. Some examples of polymeric binders that are preferably excluded from the negative electrode layer 12 of the present disclosure include polyvinylidene fluoride (PVdF), ethylene propylene diene monomer (EPDM) rubber, styrene butadiene rubber (SBR), carboxymethyl cellulose (CMC), and polyacrylic acid.

The positive electrode layer 14 may comprise one or more electrochemically active materials that can undergo a reversible redox reaction with lithium at a higher electrochemical potential than the material of the negative electrode layer 12 such that an electrochemical potential difference exists between the electrode layers 12, 14. In one form, the positive electrode layer 14 may comprise an intercalation host material that can undergo the reversible insertion or intercalation of lithium ions. In such case, the intercalation host material of the positive electrode layer 14 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). For example, the intercalation host material may comprise a layered lithium transition metal oxide, such as lithium cobalt oxide ($LiCoO_2$) and lithium-nickel-manganese-cobalt oxide $[Li(Ni_xMn_yCo_z)O_2]$, a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof. In another form, the positive electrode layer 14 may comprise a conversion material including a component that can undergo a reversible electrochemical reaction with lithium, in which the component undergoes a phase change or a change in crystalline structure accompanied by a change in oxidation state. In such case, the conversion material of the positive electrode layer 14 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode layer 14 include iron, manganese, nickel, copper, and cobalt.

The electrochemically active material of the positive electrode layer 14 may be intermingled with a polymeric binder to provide the positive electrode layer 14 with structural integrity. Some examples of suitable polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode layer 14 optionally may include particles of an electrically conductive material, which may comprise very fine particles of, for example, high-surface area carbon black.

The porous separator layer 16 may comprise any organic or inorganic material that can physically separate and electrically insulate the negative and positive electrode layers 12, 14 from each other while permitting the free flow of lithium ions therebetween. For example, the separator layer 16 may comprise a non-woven material, e.g., a manufactured sheet, web, or matt of directionally or randomly oriented fibers. As another example, the separator layer 16 may comprise a microporous polymeric material, e.g., a microporous polyolefin-based membrane or film. The separator layer 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the separator layer 16 may comprise a laminate of one or more polymeric materials, such as a laminate of PE and PP. The separator layer 16 may have a thickness in the range of 10 µm to 30 µm.

The non-aqueous electrolyte 18 may comprise any material that is capable of effectively conducting lithium ions through the separator layer 16 and between the negative and positive electrode layers 12, 14. For example, the electrolyte 18 may comprise a non-aqueous liquid electrolyte. In such case, the non-aqueous liquid electrolyte 18 may comprise a solution including a lithium salt dissolved or ionized in a nonaqueous, aprotic organic solvent or a mixture of non-aqueous, aprotic organic solvents. Some suitable lithium salts that may be used to make the electrolyte 18 include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and combinations thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a combination thereof. As another example, the non-aqueous electrolyte 18 may comprise a gel or plasticized polymer electrolyte. In such case, the non-aqueous electrolyte 18 may comprise a polymer host material soaked with a non-aqueous liquid electrolyte solution. Some examples of suitable polymer host materials include poly (vinylidene) (PVdF), poly(acrylonitrile) (PAN), poly(methyl methacrylate) (PMMA), poly(ethylene oxide) (PEO), polyacrylates, and poly(vinylidene fluoride-hexafluoropropylene) (PVdF-HFP). The electrolyte 18 also may include one or more additives formulated to improve the performance, life, and safety of the electrochemical cell 10. Some examples of suitable additives for inclusion in the electrolyte 18 include vinylene carbonate, propylene carbonate, and/or lithium bis-oxalatoborate salt.

The negative and positive electrode current collectors 20, 26 may comprise any material that is capable of collecting and reversibly passing free electrons to and from their respective electrode layers 12, 14. For example, the negative and/or positive electrode current collectors 20, 26 may comprise an electrically conductive metal or metal alloy, e.g., a transition metal or alloy thereof. In some specific examples, the negative electrode current collector 20 may comprise copper, nickel, an iron alloy (e.g., stainless steel), or titanium, and the positive electrode current collector 26 may comprise aluminum, nickel, or an iron alloy (e.g., stainless steel). Other electrically conductive metals may of course be used, if desired.

The negative and positive electrode current collectors 20, 26 each may be in the form of a thin and flexible porous or non-porous metal substrate. For example, the negative and positive electrode current collectors 20, 26 may be in the form thin and flexible non-porous metal foils, porous metal meshes, or perforated metal sheets. The specific configuration of the negative and positive electrode current collectors 20, 26 may depend upon the intended application of the electrochemical cell 10. In some embodiments, the negative and positive electrode current collectors 20, 26 may have thicknesses in the range of 8 micrometers to 20 micrometers.

The intermediate metal chalcogenide layer 32 may comprise a transition metal chalcogenide (e.g., an oxide, sulfide, and/or selenide of copper (Cu), nickel (Ni), iron (Fe), and/or titanium (Ti)). For example, the intermediate metal chalcogenide layer 32 may comprise a transition metal chalcogenide represented by one or more of the following formulas: $Me_2Ch$, $MeCh_2$, $MeCh$, or $Me_2Ch_3$, where Me is a transition metal (e.g., Cu, Ni, Fe, and/or Ti) and Ch is a chalcogen (e.g., O, S, and/or Se). The composition of the chalcogenide layer 32 may depend on the composition of the negative electrode current collector 20. For example, in embodiments where the negative electrode current collector 20 comprises copper (Cu), the chalcogenide layer 32 may comprise copper oxide (e.g., CuO and/or $Cu_2O$), copper sulfide (e.g., CuS and/or $Cu_2S$), and/or copper selenide (e.g., CuSe and/or $Cu_2Se$). Additionally or alternatively, the metal chalcogenide layer 32 may comprise a lithium chalcogenide (e.g., an oxide, sulfide, and/or selenide of lithium). For example, the metal chalcogenide layer 32 may comprise a lithium (Li) chalcogenide having the formula $Li_2Ch$, where Ch is a chalcogen (e.g., O, S, and/or Se). In some embodiments, the metal chalcogenide layer 32 may comprise a composite of one or more transition metal chalcogenides and one or more lithium chalcogenides. The chalcogenides included in the metal chalcogenide layer 32 may be stoichiometric or non-stoichiometric. The metal chalcogenide layer 32 may have a thickness in the range of one nanometer to 500 nanometers.

As shown in FIG. 1, the negative electrode current collector 20 may include a negative polarity tab 34 and the positive electrode current collector 26 may include a positive polarity tab 36. The negative and positive polarity tabs 34, 36 may be of unitary one-piece construction with their respective negative and positive electrode current collectors 20, 26. Or, the negative and positive polarity tabs 34, 36 may be manufactured separated and subsequently coupled to their respective negative and positive electrode current collectors 20, 26, for example, by being welded thereto. In practice, the negative and positive polarity tabs 34, 36 of the electrochemical cell 10 may be electrically connected to corresponding negative and positive polarity tabs of one or more other electrochemical cells (not shown) to produce a lithium metal battery (not shown). The negative and positive polarity tabs 34, 36 also may be electrically connected to an electrical device 38 via an interruptible external circuit 40.

The electrical device 38 may comprise an electrical load device, which may be powered by the electrochemical cell 10, or a power source, which may re-charge the electrochemical cell 10 through an applied external voltage.

During discharge of the electrochemical cell 10, the negative electrode layer 12 contains a relatively high concentration of elemental lithium, which is oxidized into lithium ions and electrons. The lithium ions travel from the negative electrode layer 12, through the pores of the porous separator layer 16, and to the positive electrode layer 14 via the ionically conductive electrolyte 18. At the same time, the electrons pass through the external circuit 40 from the negative electrode layer 12 to the positive electrode layer 14. The lithium ions are assimilated into the active material of the positive electrode layer 14 by an electrochemical reduction reaction. The electrochemical cell 10 may be recharged after a partial or full discharge of its available capacity by an external power source, which reverses the electrochemical reactions that transpired during discharge.

During re-charge of the electrochemical cell 10, intercalated lithium in the positive electrode layer 14 is oxidized into lithium ions and electrons. The lithium ions travel from the positive electrode layer 14 to the negative electrode layer 12 through the porous separator 16 via the electrolyte 18, and the electrons pass through the external circuit 40 to the negative electrode layer 12. The lithium cations are reduced to elemental lithium at the negative electrode layer 12 and stored on the surface 22 of the negative electrode current collector 20 for reuse.

Figure 2:
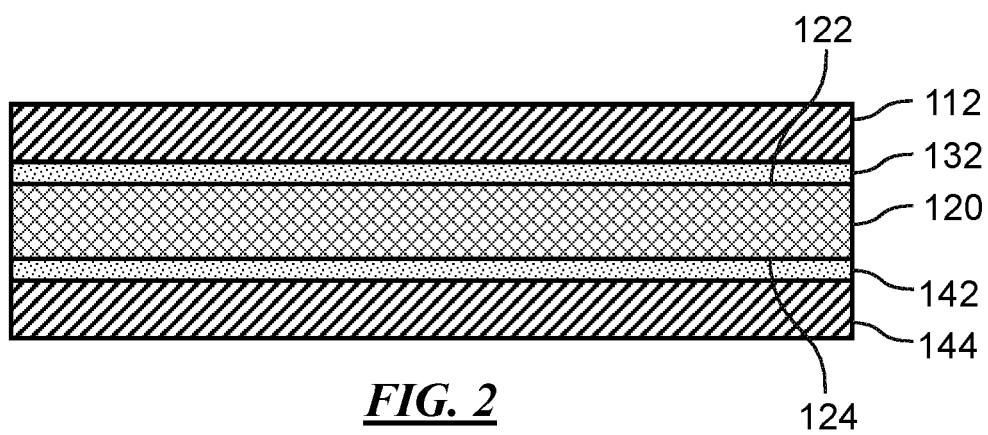
FIG. 2 is a side cross-sectional view of a negative electrode current collector having a first lithium metal negative electrode layer and a first intermediate metal chalcogenide layer formed on a first major surface thereof, and a second lithium metal negative electrode layer and a second metal chalcogenide layer formed on a second major surface thereof.

FIG. 2 depicts a side cross-sectional view of a negative electrode current collector 120 that comprises an electrically conductive metal (e.g., copper) and includes a first major surface 122 and a second major surface 124. A thin first metal chalcogenide layer 132 is formed directly on the first major surface 122 of the current collector 120, and a thin second metal chalcogenide layer 142 is formed on the second major surface 124 of the current collector 120. In addition, a first lithium metal negative electrode layer 112 is formed directly on the first metal chalcogenide layer 132 over the first major surface 122 of the current collector 120, and a second lithium metal negative electrode layer 144 is formed directly on the second metal chalcogenide layer 142 over the second major surface 124 of the current collector 120.

In FIG. 2, the first and second major surfaces 122, 124 of the current collector 120 are depicted as being substantially flat, which may be the case in embodiments where the current collector 120 comprises a metal foil or a perforated metal sheet. However, in other embodiments, for example, where the current collector 120 comprises a metal mesh, the surfaces 122, 124 of the current collector 120 may be contoured and the layers 132, 142, 112, 144 may substantially conform to the contours thereof.

The first and second major surfaces 122, 124 of the current collector 120 may be lightly abraded (e.g., sanded) prior to forming the first and second metal chalcogenide layers 132, 142 and the first and second lithium metal negative electrode layers 144 on the first and second major surfaces 122, 124 of the current collector 120.

The first and second metal chalcogenide layers 132, 142 may be coated, deposited or otherwise formed on the first and second major surfaces 122, 124 of the negative electrode current collector 120 by exposing the surfaces 122, 124 to a chalcogen in gas phase. Exposing the surfaces 122, 124 of the current collector 120 to a gaseous chalcogen allows the chalcogen to chemically react with the surfaces 122, 124 of the current collector 120 and effectively form the first and second metal chalcogenide layers 132, 142 on the surfaces 122, 124 such that the layers 132, 142 uniformly and effectively conform to the contours of the surfaces 122, 124, regardless of their configuration. In addition, in embodiments where the current collector 120 is porous, exposing the current collector 120 to a gaseous chalcogen allows the chalcogen to chemically react with the major surfaces 122, 124 of the current collector 120 and effectively and uniformly form the first and second metal chalcogenide layers 132, 142 thereon, without physically clogging or blocking the pores of the current collector 120. The surfaces 122, 124 of the negative electrode current collector 120 suitably may be exposed to a gaseous chalcogen for a sufficient duration for the metal on the surfaces 122, 124 of the current collector 120 to chemically react with the chalcogen and respectively form the first and second metal chalcogenide layers 132, 142 on the surfaces 122, 124 of the current collector 120. The thicknesses of the first and second metal chalcogenide layers 132, 142 may be controlled or adjusted by controlling the duration of chalcogen exposure. The duration of chalcogen exposure may depend upon the composition of the current collector 120 (e.g., copper, nickel, iron-based, and/or titanium), the temperature at which the current collector 120 is exposed to the gaseous chalcogen, and the rate at which the current collector 120 reacts with the gaseous chalcogen to form a chalcogenide.

Figure 3:
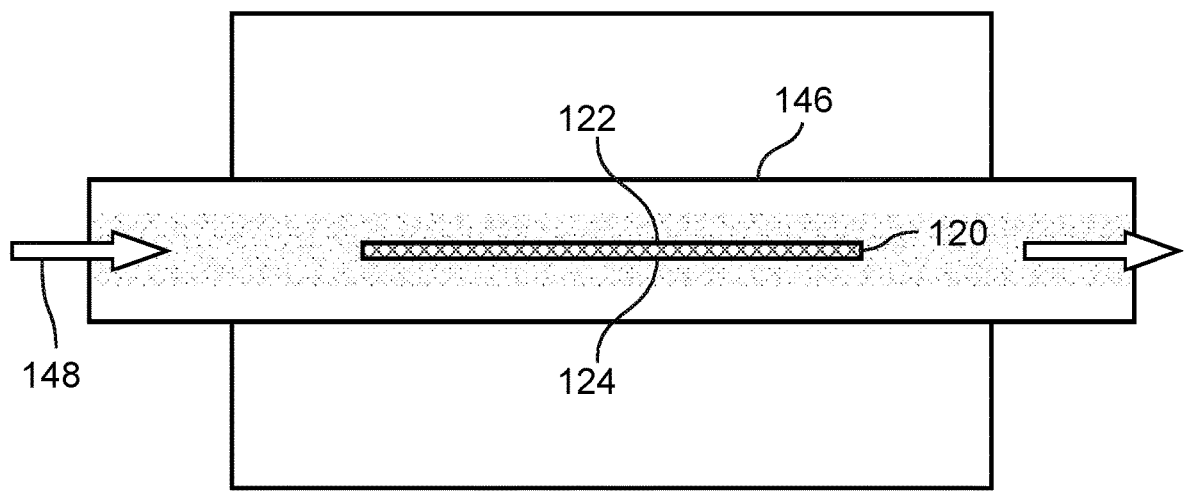
FIG. 3 is a cross-sectional view of an embodiment of an apparatus for forming a metal oxide layer on a surface of a negative electrode current collector by exposing the surface of the negative electrode current collector to a stream of air.

As shown in FIG. 3, in one form, the chalcogen may comprise oxygen (02) and the first and second major surfaces 122, 124 of the negative electrode current collector 120 may be exposed to gaseous oxygen by placing the current collector 120 in an enclosed chamber 146 and then directing a stream of air 148 (about 20-22 vol. % $O_2$) over and around the first and second major surfaces 122, 124 of the current collector 120. The stream of air 148 and the current collector 120 may be heated in the chamber 146 at a sufficient temperature and for a sufficient duration to form a first metal oxide layer on the first major surface 122 of the current collector 120 and a second metal oxide layer on the second major surface 124 of the current collector 120. In particular, the stream of air 148 and the current collector 120 may be heated in the chamber 146 at a sufficient temperature to promote oxidation of the first and second major surfaces 122, 124 of the current collector 120, without melting or negatively impacting the structural integrity of the current collector 120. For example, the stream of air 148 may be heated to a temperature greater than 200° C. and the current collector 120 may be heated within the chamber 146 to a temperature in the range of 200° C. to 1050° C. and exposed to the stream of air 148 for a duration in the range of 0.1 seconds to 10 minutes to form the first metal oxide layer on the first major surface 122 of the current collector 120 and the second metal oxide layer on the second major surface 124 of the current collector 120. In one form, the current collector 120 may be heated within the chamber 146 at a temperature of about 900° C. while being exposed to the stream of air 148 for a duration of about 10 seconds. The duration of oxygen exposure may depend upon the composition of the current collector 120, the temperature at which the current collector 120 is exposed to the stream of air 148, and the rate at which the current collector 120 reacts with oxygen to form an oxide.

Figure 4:
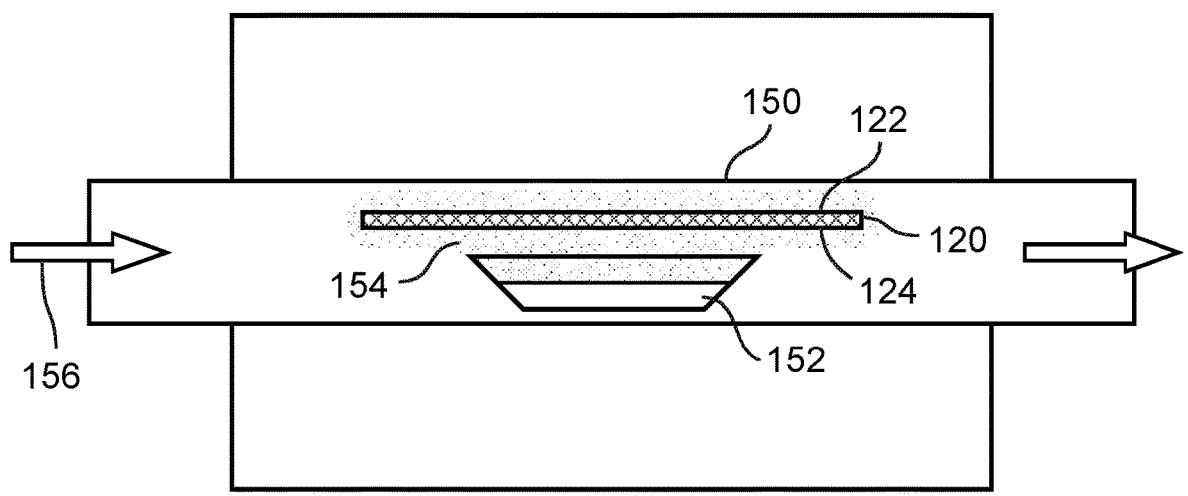
FIG. 4 is a cross-sectional view of an embodiment of another apparatus for forming a metal sulfide layer or a metal selenide layer on a surface of a negative electrode current collector by exposing the surface of the negative electrode current collector to gaseous sulfur or selenium.

As shown in FIG. 4, in other embodiments, the chalcogen may comprise sulfur (S) and/or selenium (Se), and the first and second major surfaces 122, 124 of the negative electrode current collector 120 may be exposed to gaseous sulfur and/or selenium by placing the current collector 120 in an enclosed chamber 150 along with a volume of solid phase sulfur and/or selenium 152. The solid phase sulfur and/or selenium 152 may be provided in elemental and/or compound form. The solid phase sulfur and/or selenium 152 may be heated in the chamber 150 at a temperature in the range of 100° C. to 550° C. to release gaseous sulfur and/or selenium 154 into the chamber 150 around the current collector 120. The current collector 120 may be heated in the chamber 150 at a sufficient temperature and for a sufficient duration to form a first metal sulfide and/or selenide layer on the first major surface 122 of the current collector 120 and a second metal sulfide and/or selenide layer on the second major surface 124 of the current collector 120. In particular, the current collector 120 may be heated in the chamber 150 at a temperature and for a duration that allows a chemical reaction to occur between the gaseous sulfur and/or selenium and the first and second major surfaces 122, 124 of the current collector 120, without melting or negatively impacting the structural integrity of the current collector 120. For example, the current collector 120 may be heated in the chamber 150 at a temperature in the range of 100° C. to 550° C. and may be maintained therein for a duration in the range of 0.1 seconds to 10 minutes to form the first metal sulfide and/or selenide layer on the first major surface 122 of the current collector 120 and the second metal sulfide and/or selenide layer on the second major surface 124 of the current collector 120.

A stream of an inert gas (e.g., argon) 156 may be directed through the chamber 150 while the current collector 120 and the solid phase sulfur and/or selenium 152 are heated in the chamber 150 to promote physical contact between the gaseous sulfur and/or selenium 154 and the surfaces 122, 124 of the negative electrode current collector 120. In some embodiments, a subatmospheric pressure environment may be created within the chamber 150 to promote the release of gaseous sulfur and/or selenium 154 from the volume of solid phase sulfur and/or selenium 152. In other embodiments, the solid phase sulfur and/or selenium 152 may be heated in a separate chamber (not shown) to produce a stream of gaseous sulfur and/or selenium that is supplied to the chamber 150 to promote physical contact between the gaseous sulfur and/or selenium 154 and the surfaces 122, 124 of the negative electrode current collector 120.

Figure 5:
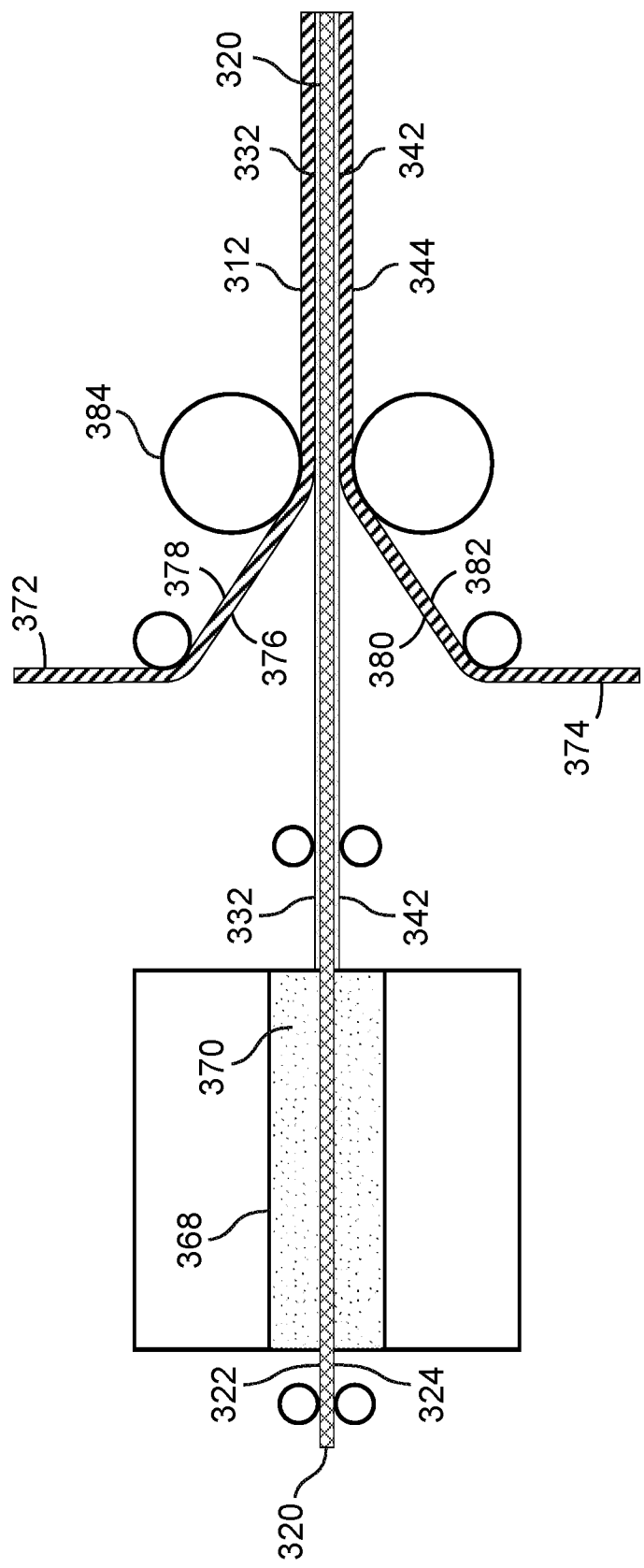
FIG. 5 is a cross-sectional view of an embodiment of an apparatus for forming a metal chalcogenide layer on a surface of a metal substrate and then laminating a lithium metal foil onto the metal chalcogenide layer on the surface of the metal substrate.

In some embodiments, the negative electrode current collector 120, including the first and second metal chalcogenide layers 132, 142 and the overlying first and second lithium metal negative electrode layers 112, 144, may be formed via a continuous process. Referring now to FIG. 5, in a first stage of the process, an electrically conductive metal substrate 320 having a first major surface 322 and an opposite second major surface 324 may be provided. For example, the metal substrate 320 may comprise a continuous metal foil, a metal mesh, or a perforated metal sheet. The surfaces 322, 324 of the metal substrate 320 may be exposed to a chalcogen in gas phase by passing the metal substrate 320 through a heated chamber 368 that comprises a gaseous chalcogen 370. As described in further detail with respect to FIGS. 3 and 4, the metal substrate 320 may be heated at a sufficient temperature and exposed to gaseous oxygen, sulfur, and/or selenium within the chamber 368 for a duration that allows for the formation of a first metal chalcogenide layer 332 on the first major surface 322 of the metal substrate 320 and a second metal chalcogenide layer 342 on the second major surface 324 of the metal substrate 320. For example, the first and second metal chalcogenide layers 332, 342 may comprise metal oxide, sulfide, and/or selenide layers.

After formation of the first and second metal chalcogenide layers 332, 342 on the first and second major surfaces 322, 324 of the metal substrate 320, a first lithium metal foil 372 and/or a second lithium metal foil 374 may be provided. The first and second lithium metal foils 372, 374 may have thicknesses in the range of 5-100 µm. The first lithium metal foil 372 may be laminated onto the first metal chalcogenide layer 332 on the first major surface 322 of the metal substrate 320 to form a first lithium metal layer 312, and the second lithium metal foil 374 may be laminated onto the second metal chalcogenide layer 342 on the second major surface 324 of the metal substrate 320 to form a second lithium metal layer 344. The first lithium metal foil 372 may have a first side 376 and an opposite second side 378 and the second lithium metal foil 374 may have a first side 380 and an opposite second side 382. Prior to lamination, the first lithium metal foil 372 may be positioned adjacent the metal substrate 320 such that the first side 376 of the first lithium metal foil 372 confronts and faces toward the first major surface 322 of the metal substrate 320 and the first side 380 of the second lithium metal foil 374 confronts and faces toward the second major surface 324 of the metal substrate 320. Thereafter, the first and/or second lithium metal foils 372, 374 may be respectively laminated onto the first and second metal chalcogenide layers 332, 342 on the first and second major surfaces 322, 324 of the metal substrate 320 by passing the metal substrate 320 and the first and/or second lithium metal foils 372, 374 between a pair of metal rollers 384.

Bonding of the first and/or second lithium metal foils 372, 374 to the first and second metal chalcogenide layers 332, 342 may be facilitated by heating and/or maintaining the first and second metal chalcogenide layers 332, 342 at a temperature above a melting point of lithium prior to and/or during the lamination process. For example, the metal substrate 320 and the first and second metal chalcogenide layers 332, 342 may be heated to a temperature above the melting point of lithium prior to and/or during the lamination process such that the first sides 376, 380 of the first and second lithium metal foils 372, 374 locally melt and actively wet the first and second metal chalcogenide layers 332, 342 on the metal substrate 320 during the lamination process, without melting the second sides 378, 382 of the first and second lithium metal foils 372, 374. Selectively and locally melting the first sides 376, 380 of the first and second lithium metal foils 372, 374 helps ensure formation of a strong chemical and physical bond between the metal foils 372, 374 and the metal chalcogenide layers 332, 342 on the metal substrate 320. The temperature of the metal substrate 320 and the first and second metal chalcogenide layers 332, 342 may be controlled during the lamination process to avoid melting of the second sides 378, 382 of the first and second lithium metal foils 372, 374 so that the structural integrity of the foils 372, 374 is maintained during the lamination process. For example, the metal substrate 320 and the first and second metal chalcogenide layers 332, 342 may be heated at a temperature in the range of 250° C. to 450° C. immediately prior to and/or during the lamination process. The specific temperature at which the metal substrate 320 and the first and second metal chalcogenide layers 332, 342 are heated may depend upon the composition of the metal substrate 320 and the first and second metal chalcogenide layers 332, 342. The second sides 378, 382 of the first and second lithium metal foils 372, 374 may be maintained at a temperature below the melting point of lithium, e.g., below 180° C. during the lamination process.

After formation of the first and second lithium metal layers 312, 344, the metal substrate 320 may be formed into the desired size and shape of one or more negative electrode current collectors (not shown) and used in the manufacture of one or more electrochemical cells of a lithium metal battery. In such case, the first and second lithium metal layers 312, 344 may comprise first and second lithium metal negative electrode layers.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing an electrochemical cell, the method comprising:
    providing a porous or non-porous metal substrate;
    exposing a surface of the metal substrate to a chalcogen in gas phase such that a conformal metal chalcogenide layer forms on the surface of the metal substrate;
    providing a lithium metal foil having a first surface and an opposite second surface; and
    laminating the lithium metal foil onto the metal chalcogenide layer on the surface of the metal substrate such that the first surface of the lithium metal foil physically and chemically bonds to the metal chalcogenide layer on the surface of the metal substrate.

2. The method of claim 1 wherein the surface of the metal substrate and the metal chalcogenide layer are heated to a temperature above a melting point of lithium such that, when the lithium metal foil is laminated onto the metal chalcogenide layer on the surface of the metal substrate, the first surface of the lithium metal foil locally melts and actively wets the metal chalcogenide layer on the surface of the metal substrate without melting the second surface of the lithium metal foil.

3. The method of claim 2 wherein the surface of the metal substrate and the metal chalcogenide layer are heated to a temperature in the range of 250° C. to 450° C. prior to laminating the lithium metal foil onto the metal chalcogenide layer on the surface of the metal substrate.

4. The method of claim 2 wherein the second surface of the lithium metal foil is maintained at a temperature below 180° C. while the lithium metal foil is laminated onto the metal chalcogenide layer on the surface of the metal substrate.

5. The method of claim 1 wherein the lithium metal foil is laminated onto the metal chalcogenide layer on the surface of the metal substrate by positioning the lithium metal foil adjacent the metal substrate such that the first surface of the lithium metal foil confronts the surface of the metal substrate, and then passing the metal substrate and the lithium metal foil between a pair of metal rollers.

6. The method of claim 1 wherein the metal substrate comprises a non-porous metal foil, a perforated metal sheet, or a porous metal mesh.

7. The method of claim 1 wherein the metal substrate comprises copper, and wherein the metal chalcogenide layer comprises copper oxide, copper sulfide, copper selenide, or a combination thereof.

8. The method of claim 1 wherein the chalcogen comprises oxygen, sulfur, selenium, or a combination thereof, and wherein the metal chalcogenide layer comprises a metal oxide, a metal sulfide, a metal selenide, or a combination thereof.

9. The method of claim 1 wherein the chalcogen comprises oxygen, and wherein the surface of the metal substrate is exposed to gaseous oxygen by heating the metal substrate in air such that the gaseous oxygen chemically reacts with and bonds to the surface of the metal substrate.

10. The method of claim 1 wherein the chalcogen comprises sulfur or selenium, and wherein the surface of the metal substrate is exposed to gaseous sulfur or selenium by heating a volume of solid phase sulfur or selenium to release a volume of gaseous sulfur or selenium therefrom, and then exposing the surface of the metal substrate to the volume of gaseous sulfur or selenium such that the gaseous sulfur or selenium chemically reacts with and bonds to the surface of the metal substrate.

11. The method of claim 1 wherein the metal substrate is non-porous and includes a first major surface and an opposite second major surface, and wherein the metal chalcogenide layer is formed on at least one of the first or second major surfaces of the metal substrate.

12. The method of claim 1 wherein the metal substrate has a thickness in the range of 8-20 μm.

13. The method of claim 1 wherein the metal chalcogenide layer has a thickness in the range of 1-500 nm.

14. The method of claim 1 wherein the lithium metal foil has a thickness in the range of 5-100 μm.

15. The method of claim 1 including forming the metal substrate into a negative electrode current collector exhibiting a desired size and shape and having at least one lithium metal negative electrode layer physically and chemically bonded thereto.

16. A method of manufacturing an electrochemical cell, the method comprising:
providing a porous or non-porous metal substrate having a first surface and an opposite second surface;
exposing the first and second surfaces of the metal substrate to a chalcogen in gas phase such that a first metal chalcogenide layer forms on the first surface of the metal substrate and a second metal chalcogenide layer forms on the second surface of the metal substrate;
providing a first lithium metal foil and a second lithium metal foil, each of the first and second lithium metal foils having a first surface and an opposite second surface; and
laminating the first and second lithium metal foils respectively onto the first and second metal chalcogenide layers on the first and second surfaces of the metal substrate such that the first surface of the first lithium metal foil physically and chemically bonds to the first metal chalcogenide layer on the first surface of the metal substrate and the first surface of the second lithium metal foil physically and chemically bonds to the second metal chalcogenide layer on the second surface of the metal substrate.

17. The method of claim 16 wherein the metal substrate and the first and second metal chalcogenide layers are heated to a temperature above a melting point of lithium such that, when the first and second lithium metal foils are respectively laminated onto the first and second metal chalcogenide layers on the first and second surfaces of the metal substrate, the first surface of the first lithium metal foil locally melts and actively wets the first metal chalcogenide layer on the first surface of the metal substrate without melting the second surface of the first lithium metal foil, and first surface of the second lithium metal foil locally melts and actively wets the second metal chalcogenide layer on the second surface of the metal substrate without melting the second surface of the second lithium metal foil.

18. The method of claim 16 wherein the first and second lithium metal foils are respectively laminated onto the first and second metal chalcogenide layers on the first and second surfaces of the metal substrate by positioning the first and second lithium metal foils adjacent the metal substrate such that the first surface of the first lithium metal foil confronts the first surface of the metal substrate and the first surface of the second lithium metal foil confronts the second surface of the metal substrate, and then passing the metal substrate and the first and second lithium metal foils between a pair of metal rollers.

* * * * *